(12) United States Patent
Brouwer et al.

(10) Patent No.: US 6,929,374 B2
(45) Date of Patent: Aug. 16, 2005

(54) MOVEMENT MECHANISM

(75) Inventors: Stefan Frits Brouwer, Den Haag (NL); Marinus Roose, Nieuwegein (NL)

(73) Assignee: Eaton Corporation, Cleveland, OH (US)

( * ) Notice: Subject to any disclaimer, the term of this patent is extended or adjusted under 35 U.S.C. 154(b) by 17 days.

(21) Appl. No.: 10/432,088

(22) PCT Filed: Nov. 20, 2001

(86) PCT No.: PCT/NL01/00844
§ 371 (c)(1), (2), (4) Date: Sep. 26, 2003

(87) PCT Pub. No.: WO02/46001
PCT Pub. Date: Jun. 13, 2002

(65) Prior Publication Data
US 2005/0099708 A1    May 12, 2005

(30) Foreign Application Priority Data
Nov. 22, 2000 (NL) .................................. 1016676

(51) Int. Cl.[7] ............................................. G02B 7/182
(52) U.S. Cl. ...................................................... 359/872
(58) Field of Search ............................... 354/871–874; 248/475.1, 476, 477, 479, 485

(56) References Cited
U.S. PATENT DOCUMENTS
6,174,062 B1 * 1/2001 Schillegger et al. ........ 359/872
* cited by examiner Primary Examiner—Euncha P. Cherry
(74) Attorney, Agent, or Firm—Anna M. Shih; Roger A. Johnston

(57) ABSTRACT

A movement mechanism comprises a substantially spherical holder and a substantially bowl-shaped ring, which, when inserted into each other, are rotatable relative to each other about at least one first axis (A), which lies in a plane which is substantially parallel with the top face of the holder. Driving means are provided for enabling movement of the holder relative to the ring. These driving means comprise a non-straight driving rod bearing-mounted in the holder and means for activating the driving rod. The driving rod is further connected with a driving part, which is rotatably mounted in a recess in the ring relative to a second axis (B), which second axis (B) lies in a plane equal or parallel to the top face of the ring, and which second axis (B) lies at an angle of approximately 90° to the first axis (A).

10 Claims, 3 Drawing Sheets

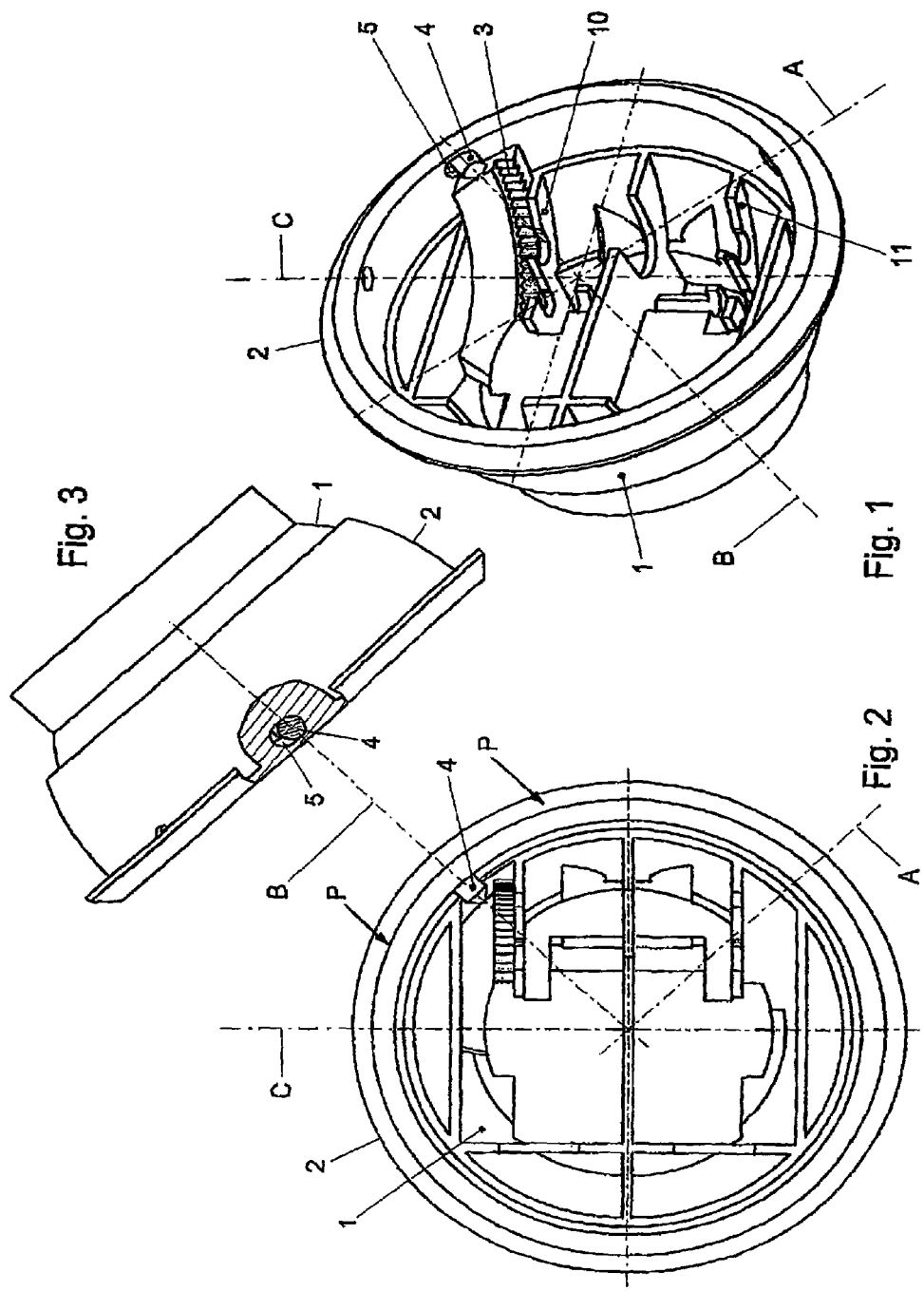

MOVEMENT MECHANISM

BACKGROUND

The present invention relates to a movement mechanism, comprising a substantially spherical holder and a substantially bowl-shaped ring, which, when inserted into each other, are rotatable relative to each other about at least one first axis, which lies in a plane which is substantially parallel with the top face of the holder, while driving means are provided for enabling movement of the holder relative to the ring, which driving means comprise a non-straight driving rod bearing-mounted in the holder, as well as means for activating the driving rod.

Such a movement mechanism can, for instance, be used for causing an object fixedly connected to the holder to make a movement about one or two axes relative to the fixedly arranged bowl-shaped ring, and can be used for, for instance, wing mirrors of vehicles, in which a mirror plate can be mounted on the bowl-shaped ring, while the holder is mounted in the housing of the mirror plate, which housing can be fixed on a vehicle. Since the driving means for the mirror plate can be fitted in the holder, a rather compact construction of the mirror-adjusting means can be obtained, which; in view of the increasingly stringent requirements imposed on the dimensions of such mirror-adjusting means, is of great importance.

A movement mechanism as described above is known for a movement about two axes from International Patent Application PCT/NL00/00326, which comprises a dish located between a holder and a bowl, which is only rotatably connected with the holder about a first axis, and which is only rotatably connected with the holder about a second axis. Here, the driving means comprise a driving rod for each of the rotation possibilities about the first and the second axis, respectively. This driving rod is provided with a projection which is moveable in and through a slot in the holder, and which engages in a second slot provided in the bowl, which is perpendicular to the slot in the holder. Between this projection and therefore also the driving rod, on the one hand, and the slots in the holder and the bowl, on the other hand, too much play not avoidable in practice appears, as a result of which the accuracy of this drive does not meet the highest requirements.

SUMMARY

The invention has for its object to prevent this drawback and to realize a relative movement of a spherical holder relative to a bowl-shaped ring about at least one axis, while the compact construction of the movement mechanism is maintained and can even be further improved in special embodiments.

To this end, according to the invention the movement mechanism is characterized in that the driving rod is connected with a driving part, which is rotatably mounted in a recess in the ring relative to a second axis, which second axis lies in a plane equal or parallel to the top face of the ring, and which second axis lies at an angle of approximately 90° to the first axis.

In a special embodiment the driving rod has the shape of a ring segment, which is rotatable about a third axis (C), which lies in a plane equal or parallel to the top face of the holder, and which lies at an angle of approximately 45° to the first (A). This embodiment is particularly important for reasons of space saving.

The above special embodiment, however, is connected with a problem. The third axis (C) lies substantially at an angle of 45° to the second axis (B). When the ring segment rotates relative to this third axis (C), the driving part will not be able to make a pure rotating movement in the recess in the ring. To solve this problem, different possibilities have been found.

In a first embodiment according to invention the recess in the ring has the shape of a slotted hole and the driving part has the shape of a cylinder, while the length of the slotted hole is substantially oriented in a direction parallel to that of the first axis (A).

In a second embodiment the driving part is movably connected with the driving rod in such a manner that, when the driving rod rotates, a relatively small displacement of the driving part in substantially a direction parallel to that of the first axis (A) becomes possible.

In a third embodiment the bowl-shaped ring has a recess, which is movably arranged in the ring in such a manner that, when the driving rod rotates, a relatively small displacement of the recess in substantially a direction parallel to that of the first axis (A) becomes possible.

Although in all of the three above embodiments the driving rod is preferably provided with a toothing and in all of these cases the driving rod can carry out a rotation movement, which is defined relative to an axis which substantially coincides with the third axis (C), this selection of the driving rod is a condition for a fourth embodiment. Here, the means for activating the driving rod are further formed by a driving system provided with a driven toothed wheel. A fourth solution of the above problem is obtained when the driving system is slidable in a direction which is substantially parallel to that of the third axis (C). Here, the driven toothed wheel will be provided with a shaft part, which is radially bearing-mounted in a groove in the driving rod.

To enable a movement of the holder relative to the ring about two substantially mutually perpendicular axes, the driving means are provided with a second non-straight driving rod, which is connected with an associated driving part, which is rotatably mounted in a second recess in the ring relative to the first axis (A), while the relevant driving rods are arranged in the holder substantially parallel to each other. Exactly by arranging the driving rods parallel to each other, an additional space is obtained in the holder for the associated motors with transmission means.

The invention not only relates to a movement mechanism, but also to a wing mirror for a vehicle provided with such a movement mechanism.

BRIEF DESCRIPTION OF THE DRAWINGS

The invention will now be explained in more detail with reference to the accompanying drawing. In this drawing:

FIG. 1 is a perspective view of the movement mechanism according to the invention;

FIG. 2 is a top plan view of the movement mechanism in FIG. 1;

FIG. 3 is a side view of this movement mechanism according to the arrows P;

Corresponding parts in these figures are indicated by equal reference numerals.

DETAILED DESCRIPTION

Figure 4:
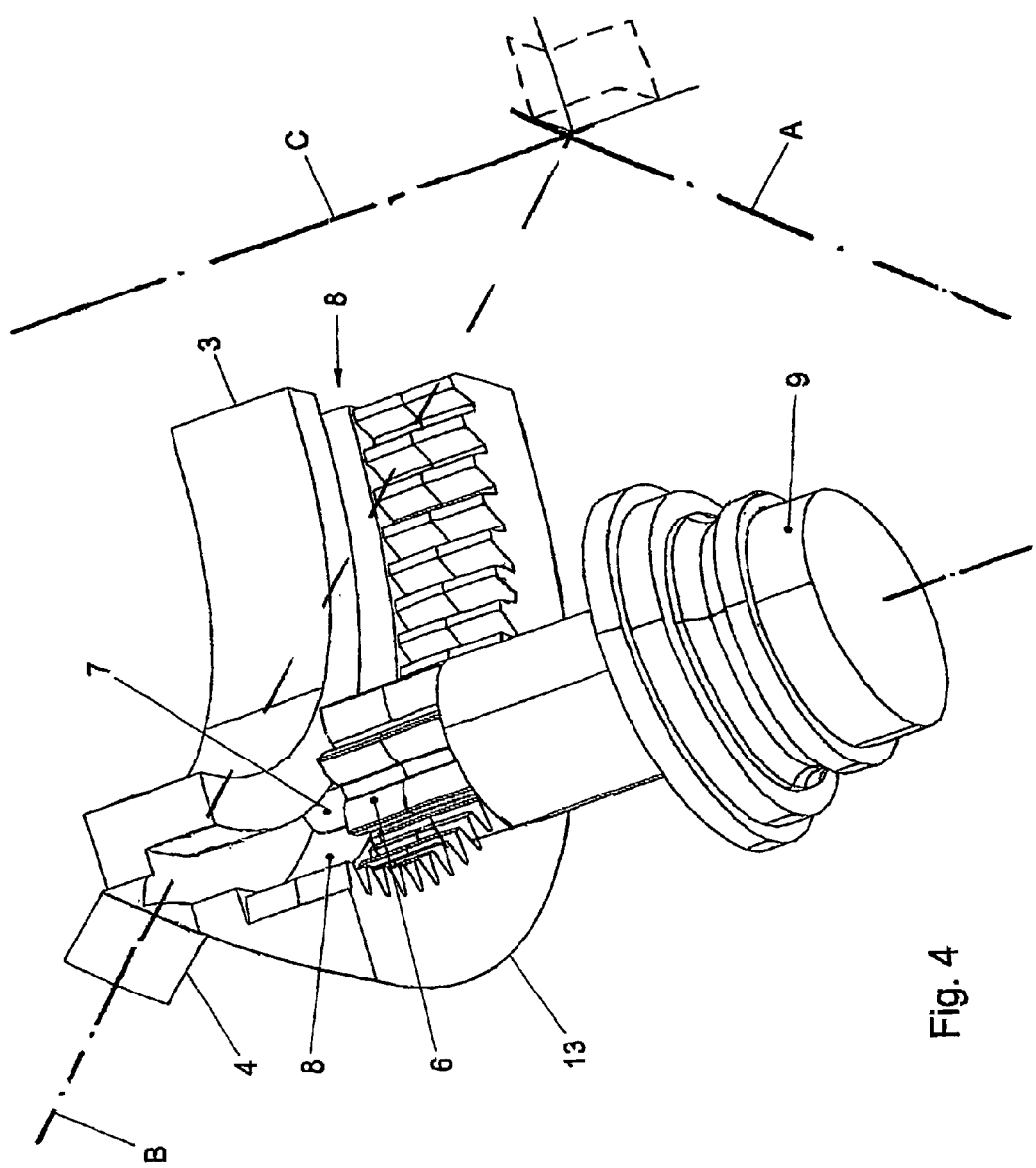
FIG. 4 shows an exemplary embodiment of the driving means for the movement mechanism.

The movement mechanism according to FIGS. 1–3 is shown for a movement of a substantially spherical holder 1 relative to a substantially bowl-shaped ring 2 about a first axis A, which lies in a plane which is substantially parallel with the top face of the holder 1. The cardanic suspension of the holder and the ring are not shown any further, because this is not important for the description of the invention. The driving means provided for enabling movement of the holder 1 relative to the ring comprise a non-straight driving rod 3 bearing-mounted in the holder 1 as well as means for activating the driving rod 3. The driving rod 3 has the shape of a ring segment rotatable relative to an axis C. This axis C lies at an angle of 45° to the axis A. The ring segment is provided with teeth mashing with the teeth of a driven toothed wheel 6 of a driving system 9 shown (see FIG. 4). This driving system 9 comprises a motor and associated transmission means; these components are not shown, however, for simplicity's sake. By actuating the stepping motor the toothed wheel 6 is driven through the transmission means, which has the result that the ring segment is displaced in the holder. Through the connection of the driving rod 3 with a driving part 4 which is rotatably mounted in a recess 5 in the ring 2 relative to an axis B perpendicular to the axis A, a displacement of the driving rod 3 in the holder means that the driving part 4 displaces the ring 2 relative to the holder 1. The driving part 4 is designed as a cylindrical element.

Figure 5A:
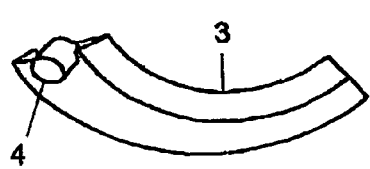
FIGS. 5A–5C show, seen from different angles, an embodiment of the driving rod with the driving parts.
Figure 5B:
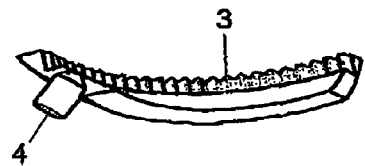
Figure 5C:
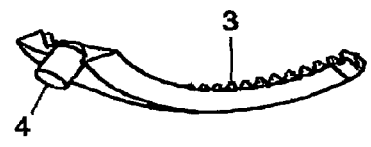
Figure 6A:
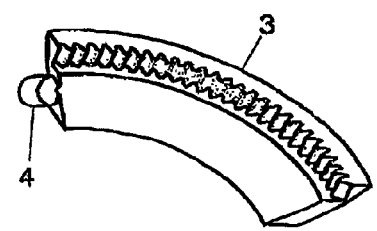
FIGS. 6A–6D show, seen from different angles, another embodiment of the driving rod with the driving parts.
Figures 6B, 6C:
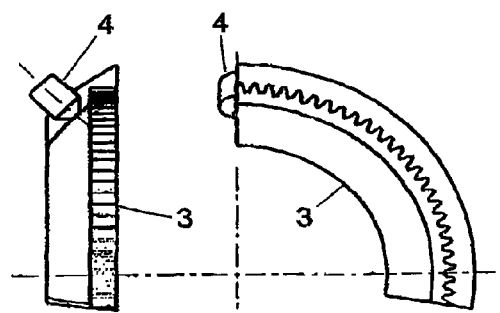
Figure 6D:

If the driving rod 3 was arranged in such a manner that it could be rotated about the axis A, then the recess 5 could be circular, and if the holder and the ring rotated relative to each other about the axis B, then the driving part 4 could make a rotating movement about its axis coinciding with the axis B. For this situation the driving rod 3 and the driving part 4 are shown in FIGS. 5A–5C. In the embodiment of FIGS. 1–3 the driving rod 3, however, can only move parallel to a plane perpendicular to the axis C. During this movement the driving part 4 is moved somewhat laterally while taking the ring 2 along. In the embodiment shown this is rendered possible by giving the recess 5 the shape of a slotted hole. For this situation the driving rod 3 and the driving part 4 are shown in FIGS. 6A–6D. The reason for which the driving rod 3 is movable parallel to a plane perpendicular to the axis C resides in the fact that the movement mechanism described herein will be used in practice for a movement of the holder relative to the ring about two axes, namely A and B, and that for a rotation about one of the two axes it is favorable to actuate both motors provided for the purpose. For a movement mechanism of another type this uses is already described in the above International Patent Application PCT/NL00/00326. Here, the driving mechanism 3 is arranged on the side of the partition 10. Diametrically relative to a plane extending parallel to this partition through the center of the movement mechanism a partition 11 is provided parallel to the partition 10. For a two-axis movement of the holder 1 relative to the ring 2 a second driving rod is arranged on the side of this partition, that is to say in the same way as the driving rod 3 is arranged on the side of the partition 10. Of course, the driving means required therefor are arranged in the holder. In that case the arrangement of the two driving rods gives an additional space saving compared to the situation in which the two driving rods are perpendicular to each other, as is the case in the above international patent application. Because the movements about the two axes A and B are otherwise realized in a similar manner, in the embodiment depicted the movement mechanism is only shown for a movement about the axis A.

Figure 7A:
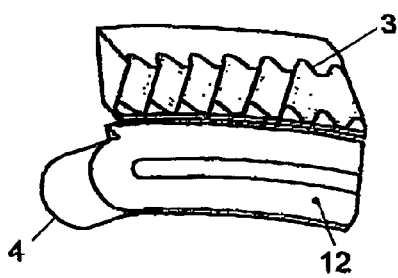
FIGS. 7A–7E show, seen from different angles, a further embodiment of the driving rod with the driving part.
Figure 7B:
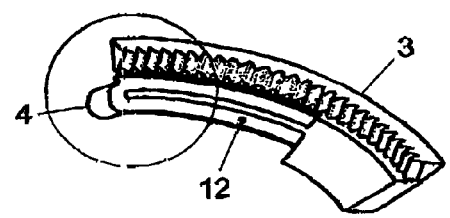
Figures 7C, 7D:
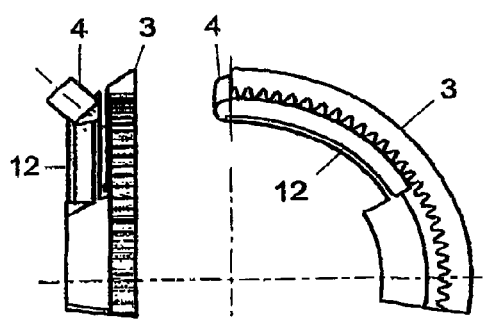
Figure 7E:
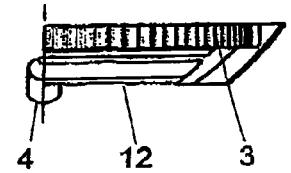

In another embodiment the recess is kept circular indeed, but the driving part 4 is somewhat movably connected with the driving rod 3. This situation is shown in FIGS. 7A–7E, of which FIG. 7A is a magnified view of a detail in FIG. 7B. Here, the driving part 4 is connected with the driving rod through an elastic element 12.

In yet another embodiment, as shown in FIG. 4, the recess 5 is also kept circular. A laterally directed movement of the driving part 4 occurring during the displacement of the driving rod 3 is prevented by providing the toothed wheel 6 with a shaft part 7 which is radially bearing-mounted in a groove 8 in the driving rod 3. During the displacement of the driving rod 3 a slight axial movement is possible between the shaft part 7 and the groove 8.

The invention is not limited to the exemplary embodiments described herein with reference to the drawing, but comprises all kinds of modifications thereof, of course as far as falling with the scope of protection of the appended claims. Thus, for instance, it is possible to make up the laterally directed movement of the driving part 4 occurring during a displacement of the driving rod 3 by providing the recess 5 in a plate piece which is laterally displaceable relative to the ring 2. It is further possible to provide a crown toothing, instead of the toothing shown in FIG. 4, on the surface 13 of the driving rod 3. The driving system 9 can then be arranged in a position rotated through 90°.

What is claimed is:

1. A movement mechanism, comprising a substantially spherical holder (1) and a substantially bowl-shaped ring (2), which, when inserted into each other, are rotatable relative to each other about at least one first axis (A), which lies in a plane which is substantially parallel with the top face of the holder (1), while driving means are provided for enabling movement of the holder (1) relative to the ring (2), which driving means comprise a non-straight driving rod (3) bearing-mounted in the holder (1), as well as means (6, 9) for activating the driving rod (3), characterized in that the driving rod (3) has the shape of a ring segment and is connected with a driving part (4), which is rotatably mounted in a recess (5) in the ring (2) relative to a second axis (B), which second axis (B) lies in a plane equal or parallel to the top face of the ring (2), and which second axis (B) lies at an angle of approximately 90° to the first axis (A), wherein the ring segment is rotatable about a third axis (C) which lies in a plane equal or parallel to the top face of the holder (1) and which lies at an angle of approximately 45° to the first axis (A).

2. A wing mirror for a vehicle, provided with a movement mechanism according to claim 1.

3. A movement mechanism according to claim 1 characterized in that the recess (5) has the shape of a slotted hole and the driving part (4) has the shape of a cylinder, while the length of the slotted hole is substantially oriented in a direction parallel to that of the first axis (A).

4. A movement mechanism according to claim 1, characterized in that the driving part (4) is movably connected with the driving rod (3) in such a manner that, when the driving rod (3) rotates, a relatively small displacement of the driving part (4) in substantially a direction parallel to that of the first axis (a) becomes possible.

5. A movement mechanism according to claim 1, characterized in that the ring is provided with a recess (5), which is movably arranged in the ring (2) in such a manner that, when the driving rod (3) rotates, a relatively small displacement of the recess in substantially a direction parallel to that of the first axis (A) becomes possible.

6. A movement mechanism according to claim 1, characterized in that the driving rod (3) is provided with a toothing and can carry out a rotation movement, which is defined relative to an axis which substantially coincides with the third axis (C).

7. A movement mechanism according to claim 6, characterized in that the means for activating the driving rod (3) are formed by the driving system (9) provided with a driven toothed wheel (6).

8. A movement mechanism according to claim 7, characterized in that the driving system (9) is slidable in a direction which is substantially parallel to that of the third axis (C).

9. A movement mechanism according to claim 7, characterized in that the driven toothed wheel (6) is provided with a shaft part (7), which is radially bearing-mounted in a groove (8) in the driving rod (3).

10. A movement mechanism according to claim 1, characterized in that, to enable a movement of the holder relative to the ring about two substantially mutually perpendicular axes, the driving means are provided with a second non-straight driving rod, which is connected with an associated driving part, which is rotatably mounted in a second recess in the ring relative to the first axis (A), while the relevant driving rods are arranged in the holder substantially parallel to each other.

* * * * *